(12) United States Patent
Li et al.

(10) Patent No.: US 10,931,095 B1
(45) Date of Patent: Feb. 23, 2021

(54) RELAY-TYPE LEAKAGE CURRENT PROTECTION DEVICE

(71) Applicant: Chengli Li, Suzhou (CN)

(72) Inventors: Chengli Li, Suzhou (CN); Long Chen, Suzhou (CN); Shengyun Nie, Suzhou (CN)

(73) Assignee: Chengli Li, Suzhou (CN)

( * ) Notice: Subject to any disclaimer, the term of this patent is extended or adjusted under 35 U.S.C. 154(b) by 28 days.

(21) Appl. No.: 16/564,857

(22) Filed: Sep. 9, 2019

(30) Foreign Application Priority Data

Sep. 5, 2019 (CN) .......................... 201910835401.1
Sep. 5, 2019 (CN) .......................... 201921467553.2

(51) Int. Cl.
*H02H 3/33* (2006.01)
*H02H 3/32* (2006.01)
*H02H 3/04* (2006.01)
*H02H 1/00* (2006.01)

(52) U.S. Cl.
CPC ............ *H02H 3/32* (2013.01); *H02H 1/0007* (2013.01); *H02H 3/044* (2013.01); *H02H 3/335* (2013.01)

(58) Field of Classification Search
CPC .......... H02H 3/335; H02H 3/044; H02H 3/22; H02H 1/0007
See application file for complete search history.

(56) References Cited

U.S. PATENT DOCUMENTS

| 4,255,773 A * | 3/1981 | Jabbal ...................... H02H 3/33 340/650 |
| 4,556,773 A * | 12/1985 | Yoshiyuki .............. H05B 6/666 219/721 |
| 2009/0289501 A1* | 11/2009 | Garb ........................ G06F 1/266 307/39 |
| 2017/0222425 A1* | 8/2017 | Li ............................ H02H 3/02 |
| 2017/0373684 A1* | 12/2017 | Hu .......................... H03K 17/72 |

\* cited by examiner

*Primary Examiner* — Harry R Behm
(74) *Attorney, Agent, or Firm* — Chen Yoshimura LLP

(57) ABSTRACT

A relay-type leakage current protection device includes a switch circuit, a relay circuit, a leakage current detection circuit, a self-test circuit, and a drive circuit. The switch circuit controls electrical connection between input and output ends of the power supply. The relay circuit is coupled to the input end and controls the open/close state of the switch circuit. The leakage current detection circuit detects a leakage current on the power supply lines. The self-test circuit is coupled to the power supply lines and the leakage current detection circuit, to generate a self-test pulse signal which simulates the leakage current and to detect a fault condition in the leakage current detection circuit. The drive circuit drives the relay circuit in response to receiving a leakage current signal from the leakage current detection circuit or a fault signal from the self-test circuit.

16 Claims, 5 Drawing Sheets

RELAY-TYPE LEAKAGE CURRENT PROTECTION DEVICE

BACKGROUND OF THE INVENTION

Field of the Invention

This invention relates to electrical appliances, and in particular, it relates to a relay-type leakage current protection device for electrical appliances.

Description of Related Art

With the wide-spread use of electrical appliances in the homes, the safety of such appliances is important. Currently, many home electrical appliances are equipped with protection devices, such as electrical plugs incorporating leakage current protection devices. However, such devices still have certain shortcomings. For example, when internal components of the protection device become faulty and lose their protection function, the relay coil of the protection device may still have current flowing through it, so that the power input end and the load end are still electrically connected. This is a hidden safety threat in the use of the electrical appliances.

There is a great need for a leakage current protection device that is easy to install, low cost, and safe to use.

SUMMARY

Accordingly, the present invention is directed to a relay-type leakage current protection device that substantially obviates one or more of the problems due to limitations and disadvantages of the related art.

In one aspect, the present invention provides a relay-type leakage current protection device, coupled to a power supply line having an input end and an output end, which includes a switch circuit, a relay circuit, a leakage current detection circuit, a self-test circuit, and a drive circuit. The switch circuit is coupled on the power supply line between the input end and an output end, and configured to control electrical connection between the input end and the output end. The relay circuit is coupled to the input end and the switch circuit, and configured to control an open/close state of the switch circuit. The leakage current detection circuit is coupled to the power supply lines, and configured to output a leakage current signal in response to detecting a leakage current at the output end of the power supply lines. The self-test circuit is coupled to the power supply lines and the leakage current detection circuit, and configured to periodically generate a self-test pulse signal which simulates the leakage current and to output a fault signal in response to detecting a fault condition in the leakage current detection circuit. The drive circuit is coupled to the leakage current detection circuit, the self-test circuit and the relay circuit, and configured to drive the relay circuit in response to receiving the leakage current signal from the leakage current detection circuit or the fault signal from the self-test circuit. The relay circuit includes a current limiting circuit, a relay, and an auxiliary reset element. The current limiting circuit is configured to supply a working current to the relay circuit. The relay is coupled to the current limiting circuit, and configured to control the open/close state of the switch circuit. The auxiliary reset element is coupled to the relay, and configured to control operation of the relay.

In one embodiment, the drive circuit includes a drive control circuit, coupled at one end to the auxiliary reset element and at another end to the leakage current detection circuit and the self-test circuit, and configured to, in response to receiving the leakage current signal or the fault signal, control the auxiliary reset element to be in a non-conducting state, whereby the switch circuit becomes open.

In one embodiment, the current limiting circuit includes a resistor-capacitor voltage step-down circuit and a rectifier. The resistor-capacitor voltage step-down circuit is configured to limit a maximum current flowing through the relay. The rectifier is coupled at one end to the resistor-capacitor voltage step-down circuit and at another rend to an end of the relay, and configured to supply a rectified working current to the relay.

In one embodiment, the current limiting circuit includes a voltage step-down circuit and a rectifier. The voltage step-down circuit is configured to limit a maximum current flowing through the relay. The rectifier is coupled at one end to the voltage step-down circuit and at another rend to an end of the relay, and configured to supply a rectified working current to the relay.

In one embodiment, the rectifier is a half-wave rectifier or a full-wave rectifier.

In one embodiment, the drive circuit further includes a normally open reset switch, coupled in parallel to the drive control circuit, wherein the normally open reset switch is configured to, when the switch circuit is in an open state and the normally open reset switch is closed briefly, control the auxiliary reset element to be in a conductive state, whereby the switch circuit becomes closed.

In one embodiment, the relay circuit further includes a normally closed reset switch, coupled between the current limiting circuit and the relay, or coupled between the input end and the current limiting circuit, configured to control the operation of the relay and control a state of the drive circuit to reset the relay-type leakage current protection device.

In another aspect, the present invention provides a relay-type leakage current protection device, coupled to a power supply line having an input end and an output end, which includes a switch circuit, a relay circuit, a leakage current detection circuit, a self-test circuit, and a drive circuit. The switch circuit is coupled on the power supply line between the input end and an output end, and configured to control electrical connection between the input end and the output end. The relay circuit is coupled to the input end and the switch circuit, and configured to control an open/close state of the switch circuit. The leakage current detection circuit is coupled to the power supply lines, and configured to output a leakage current signal in response to detecting a leakage current at the output end of the power supply lines. The self-test circuit is coupled to the power supply lines and the leakage current detection circuit, and configured to periodically generate a self-test pulse signal which simulates the leakage current and to output a fault signal in response to detecting a fault condition in the leakage current detection circuit. The drive circuit is coupled to the leakage current detection circuit, the self-test circuit and the relay circuit, and configured to drive the relay circuit in response to receiving the leakage current signal from the leakage current detection circuit or the fault signal from the self-test circuit. The relay circuit includes a current limiting circuit, a relay, an auxiliary reset element, a fuse, and a first drive control element. The current limiting circuit is configured to supply a working current to the relay circuit. The relay is coupled to the current limiting circuit, and configured to control the open/close state of the switch circuit. The auxiliary reset element is coupled to the relay, and configured to control operation of the relay. The fuse is coupled because the input end and the current limiting circuit. The first drive control element is coupled at its first end to the fuse, at its second to the self-test circuit, and at its third end to ground, and configured to increase a current flowing through the fuse in response to receiving the fault signal from the self-test circuit, wherein melting of the fuse interrupts the working current flowing through the relay, whereby the switch circuit becomes open.

In one embodiment, the drive circuit includes a second drive control element, coupled at its first end to the relay circuit, at its second to the leakage current detection circuit, and at its third end to the ground, and configured to, in response to receiving the leakage current signal from the leakage current detection circuit, control the auxiliary reset element to be in an non-conducting state, whereby the switch circuit becomes open.

In one embodiment, the current limiting circuit includes a resistor-capacitor voltage step-down circuit and a rectifier. The resistor-capacitor voltage step-down circuit is configured to limit a maximum current flowing through the relay. The rectifier is coupled at one end to the resistor-capacitor voltage step-down circuit and at another rend to an end of the relay, and configured to supply a rectified working current to the relay.

In one embodiment, the current limiting circuit includes a voltage step-down circuit and a rectifier. The voltage step-down circuit is configured to limit a maximum current flowing through the relay. The rectifier is coupled at one end to the voltage step-down circuit and at another rend to an end of the relay, and configured to supply a rectified working current to the relay.

In one embodiment, the rectifier is a half-wave rectifier or a full-wave rectifier.

In one embodiment, the drive circuit further includes a normally open reset switch, coupled in parallel to the second drive control circuit, wherein the normally open reset switch is configured to, when the switch circuit is in an open state and the normally open reset switch is closed briefly, control the auxiliary reset element to be in a conductive state, whereby the switch circuit becomes closed.

In one embodiment, the relay circuit further includes a normally closed reset switch, coupled between the current limiting circuit and the relay, or coupled between the input end and the current limiting circuit, configured to control the operation of the relay and control a state of the drive circuit to reset the relay-type leakage current protection device.

Compared to conventional technologies, to enhance the protection effectiveness, the leakage current protection device according to embodiments of the present invention is provided with a relay circuit, so that when certain internal components become faulty, the device can timely cut off current to the relay, so as to disconnect the electrical connection between the input end and the load end. This provides improved protection to the persons and property of the users.

BRIEF DESCRIPTION OF THE DRAWINGS

Preferred embodiments of the present invention are described with reference to the drawings. These drawings explain the embodiments and their operating principle, and only illustrate structures that are necessary for the understanding of the invention. These drawings are not to scale. In the drawings, like features are designated by like reference symbols.

DETAILED DESCRIPTION OF PREFERRED EMBODIMENTS

Embodiments of the present invention are described below with reference to the drawings. These drawings and descriptions explain embodiments the invention but do not limit the invention. Other embodiments are possible without departing from the spirit and scope of the invention. Various modification and variations can be made in both the structure and the working principle of the device. Thus, it is intended that the scope of the invention is defined by the appended claims.

Some technical details that are well known to those of ordinary skill in the are not fully described here, but they should be deemed a part of the present disclosure. The connection lines between components are drawn for purpose of explanation, to indicate that the components at the ends of each line are electrically connected; however, electrical connection may also exist between components that are not linked by lines. In this disclosure, "coupled" usually means electrically coupled.

The main technical problems addressed by embodiments of the present invention are as follows. In conventional leakage current protection devices, sometimes, when certain internal components of the device are faulty, the relay coil still has current flow through it; therefore, the input and output ends are still electrically connected to each other. This is a safety threat for users.

To solve the above problems, embodiments of the present invention provide a leakage current detection and protection device, which includes a switch circuit, a relay circuit, a leakage current detection circuit, a self-test circuit, and a drive circuit. The relay circuit is coupled to the input end, the switch circuit, the leakage current detection circuit, and the drive circuit. When the leakage current detection circuit generates a leakage current signal and/or the self-test circuit generates a fault signal, the relay circuit operates the drive circuit to drive the switch circuit to cut off electrical connection.

First Embodiment

Figure 1:
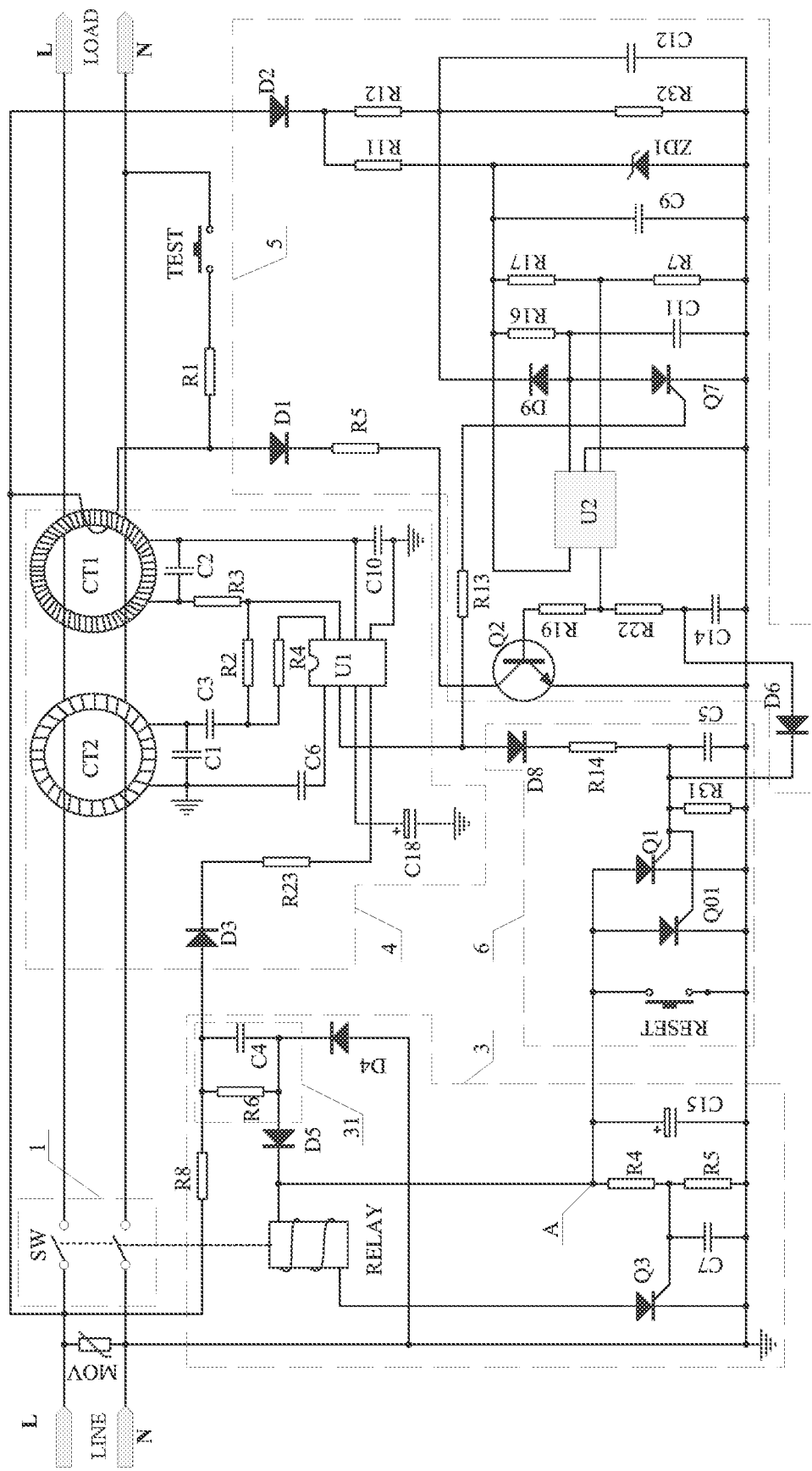
FIG. 1 is a circuit diagram of a relay-type leakage current protection device according to a first embodiment of the present invention.

As shown in FIG. 1, the relay-type leakage current protection device according to the first embodiment includes: a switch circuit 1, a relay circuit 3, a leakage current detection circuit 4, a self-test circuit 5, and a drive circuit 6. The switch circuit 1 is coupled between the input end LINE and output end LOAD of the main power lines, to control the electrical connection between the input end LINE and the output end LOAD. The relay circuit 3 is coupled to the input end LINE and the switch circuit 1, for controlling the operation of the switch circuit 1. The leakage current detection circuit 4 is coupled to the main power lines, to detect leakage current that may be present at the output end LOAD of the main power lines. The self-test circuit 5 is coupled to the main power lines and the leakage current detection circuit 4, for periodically generating self-test pulse signals that simulates a leakage current, to detect whether the leakage current detection circuit 4 is faulty. The drive circuit 6 is coupled to the leakage current detection circuit 4, the self-test circuit 5 and the relay circuit 3, for driving the relay circuit 3 based on a received leakage current signal and/or a fault signal indicating a faulty condition of the leakage current detection circuit 4.

As shown in FIG. 1, the relay circuit 3 includes a current limiting circuit, a relay RELAY, and an auxiliary reset element Q3. In this embodiment, the current limiting circuit is coupled to the input end LINE, and supplies a stable working current to the relay RELAY. The relay RELAY is coupled to the current limiting circuit, and functions to control the switching operation of the switch circuit 1. The auxiliary reset element Q3 is coupled to the relay RELAY, for controlling the open/close state of the relay RELAY.

As shown in FIG. 1, the current limiting circuit includes a resistor-capacitor voltage step-down circuit 31 and a rectifier. The rectifier includes diode D4 and diode D5; i.e., the rectifier in this embodiment is a half-wave rectifier. The resistor-capacitor voltage step-down circuit 31 includes resistor R6 and capacitor C4 coupled in parallel, where resistor R6 discharges capacitor C4. One end of the resistor-capacitor voltage step-down circuit 31 is coupled to the input end LINE via resistor R8, and functions to limit the maximum working current that flows through the relay RELAY. Diodes D4, D5 of the rectifier are both coupled to the resistor-capacitor voltage step-down circuit 31; the other end of diode D5 is coupled to the relay RELAY to rectify the current, and the other end of diode D4 is coupled to ground. Diode D4 charges capacitor C4, so that the rectifier supplies a rectified working current to the relay RELAY.

In this embodiment, the current limiting circuit may be provided at any location of the circuit of the relay circuit 3 so long as it achieves the function of supplying the working current to the relay circuit 3.

Further, in FIG. 1, the drive circuit 6 includes at least a drive control circuit and a reset switch RESET that is normally open. More specifically, the drive control circuit includes at least two transistors (e.g., transistors Q01 and Q1) coupled in parallel. The drive control circuit is coupled to the relay circuit 3 at one end, and coupled respectively to the leakage current detection circuit 4 and self-test circuit 5 at the other end. In response to a leakage current signal and/or a fault signal, the drive control circuit controls the auxiliary reset element Q3 to become open (non-conductive), so that the switch circuit 1 is open. The normally open reset switch RESET is coupled in parallel to the drive control circuit. After the switch circuit 1 is opened by the drive control circuit, the normally open reset switch RESET may be closed briefly (e.g. pressed by the user), which causes the auxiliary reset element Q3 to become conductive, so as to close the switch circuit 1.

As shown in FIG. 1, the leakage current detection circuit 4 includes a leakage current detector ring CT1 and a neutral line detector ring CT2, with the phase line L and neutral line N passing through them, as well as a leakage current detection circuit (including a leakage current detection chip U1 and other relevant electrical elements, such as capacitor C2) coupled to the leakage current detector ring CT1. When a current imbalance is present in the phase L and neutral N lines that pass through the leakage current detector ring CT1, i.e., when a leakage current is present, the leakage current detector ring CT1 generates a corresponding voltage signal. The leakage current detection chip U1 detects the voltage signal on the leakage current detector ring CT1, and in response thereto, controls the drive circuit 6 to drive the relay circuit 3 to open the switch circuit 1.

In this embodiment, the self-test circuit 5 performs periodic tests of the proper functioning of the leakage current detection circuit 4. The self-test circuit 5 includes a power supply circuit, a periodic timing circuit, and self-test pulse signal generating circuit for generating a simulated leakage current. Referring to FIG. 1, the power supply circuit includes resistors R11 and R12, Zener diode ZD1, and capacitor C12. The periodic timing circuit includes resistor R16 and a timing element (e.g., capacitor C11) coupled in series, for generating the period of the self-test pulse signal. The self-test pulse signal generating circuit includes a switch (e.g., silicon-controller rectifier Q2), comparator U2, diode D6, capacitor C14, resistor R22, and resistors R5 and R19 which are respectively coupled to the collector and base of the transistor Q2. When the leakage current detection device is operating, the self-test circuit 5 periodically applies to the leakage current detector ring CT1 a simulated leakage current that exceeds a threshold value.

The operating principle of the leakage current protection device of this embodiment is explained below.

When the relay circuit 3 is coupled to the input end LINE, a current flows through resistor R8, capacitor C4, diode D5, capacitor C15, resistor R4, and resistor R5 of the relay circuit 3, to trigger the auxiliary reset element Q3 to become and remain conductive. Therefore, a current loop is formed from the input end LINE, through resistor R8, capacitor C4, diode D5, relay RELAY, and auxiliary reset element Q3 to ground. Thus, the relay RELAY generates a magnetic field to cause the switch circuit 1 to be closed, thereby accomplishing the electrical connection between the input end LINE and the output end LOAD.

Meanwhile, the diode D3 of the leakage current detection circuit 4 and the diode D2 of the self-test circuit 5 respectively conduct a current to supply working power to the leakage current detection circuit 4 and self-test circuit 5.

When the leakage current detector ring CT1 detects a leakage current (i.e., a ground fault), it generates a corresponding voltage signal. The leakage current detection chip U1, in response to the voltage signal from the leakage current detector ring CT1, triggers the transistors Q01 and Q1 of the drive circuit 6 via diode D8 and resistor R14, causing these transistors to become and remain conductive. As a result, the internal resistance of transistors Q01 and Q1 are lower than the resistance of the relay RELAY, which lowers the voltage level at point A of FIG. 1. Consequently, no current flows through the relay RELAY, causing the switch circuit 1 to become open, cutting off the power at the output end LOAD.

When the detection function of the leakage current detection circuit 4 is lost (for example, when capacitor C2 is shorted or the leakage current detection chip U1 is faulty), the periodic self-test signals generated by transistor Q2 of the self-test circuit 5 cannot be coupled back to the self-test circuit 5. As a result, resistor R22 charges capacitor C14, causing a current to flow through diode D6, which in turn triggers the transistors Q11 and Q1 of the drive circuit 6 to become and remain conductive. As a result, the internal resistance of transistors Q11 and Q1 are lower than the resistance of the relay RELAY, which lowers the voltage level at point A of FIG. 1. Consequently, no current flows through the relay RELAY, causing the switch circuit 1 to become open, cutting off power at the output end LOAD.

Also, after the switch circuit 1 is open, when the normally open reset switch RESET of the drive circuit 6 is briefly closed (e.g. pressed by the user), transistors Q11 and Q1 are shorted by the reset switch and their holding current also becomes zero. As a result, the relay RELAY controls the switch circuit 1 to close again, and the leakage current protection device can operate normally.

The relay-style leakage current protection device of this embodiment is operable to, in response to detecting a ground fault and/or a fault in the leakage current detection circuit, use the drive circuit to control the relay circuit to open the switch circuit. This prevents the hidden safety threat during operation, thereby improving the safety of the leakage current protection device and the connected electrical appliances.

Second Embodiment

Figure 2:
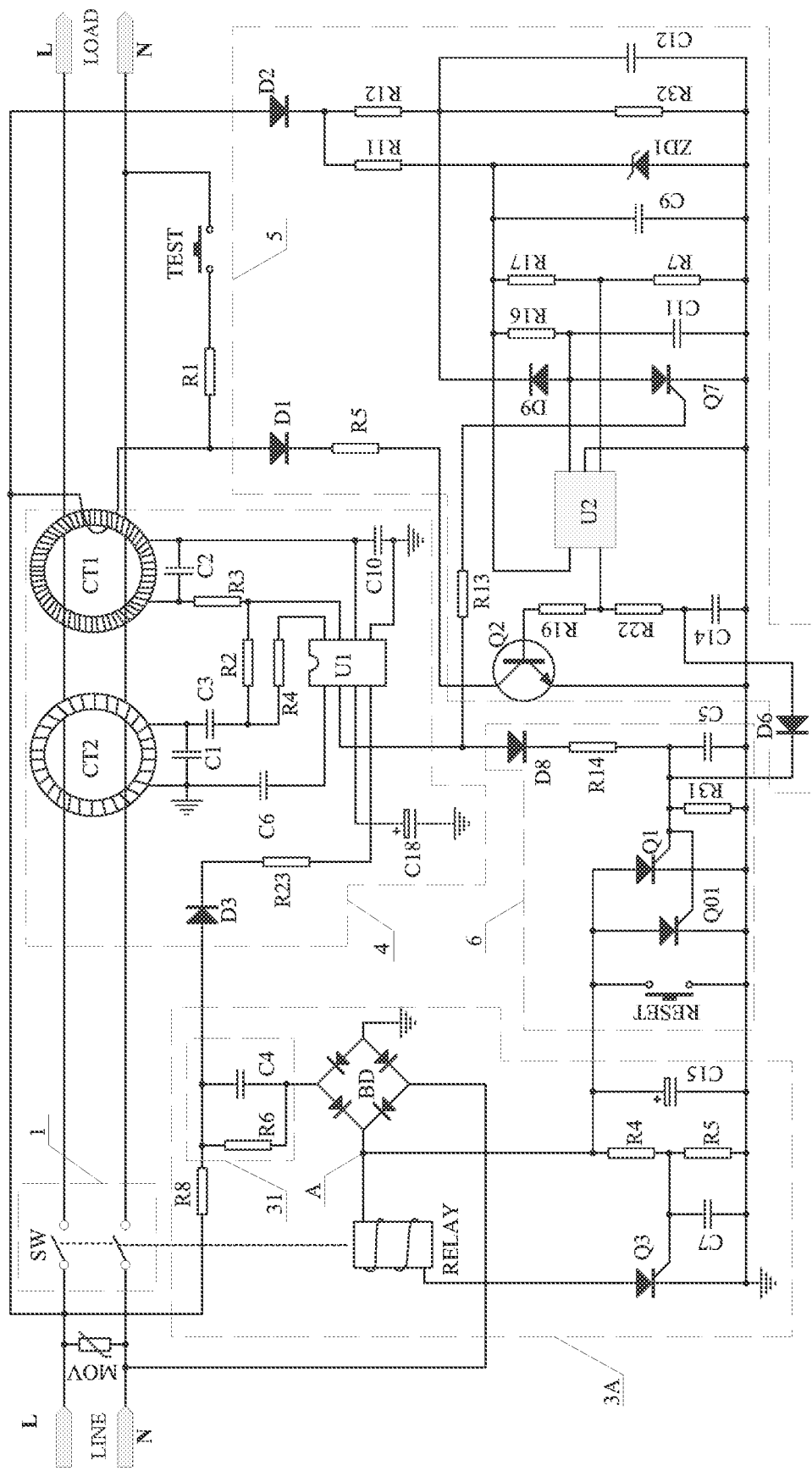
FIG. 2 is a circuit diagram of a relay-type leakage current protection device according to a second embodiment of the present invention.

FIG. 2 illustrates a relay-type leakage current protection device according to the second embodiment. In this embodiment, the leakage current protection device includes: a switch circuit 1, a relay circuit 3A, a leakage current detection circuit 4, a self-test circuit 5, and a drive circuit 6. The structure and function of the switch circuit 1, the leakage current detection circuit 4, the self-test circuit 5, and the drive circuit 6 are the same as or similar to those of the corresponding circuits of the first embodiment, and their descriptions will not be repeated here.

As shown in FIG. 2, in the relay circuit 3A, the rectifier BD is a full-wave rectifier; its first end is coupled to the resistor-capacitor voltage step-down circuit 31, its second end is coupled to the relay RELAY, its third end is coupled to the neutral line N, and its fourth end is coupled to ground. As compared to the first embodiment, the rectifier BD can provide twice the current to the relay RELAY.

In this embodiment, the current limiting circuit (the voltage step-down circuit and the rectifier) may be provided at any location of the circuit of the relay circuit 3A so long as it achieves the function of supplying the working current to the relay circuit 3A.

The operating principle of the leakage current protection device of the second embodiment is similar to that of the first embodiment and the description is not repeated here.

The leakage current protection device of the second embodiment is suitable for situations where the relay requires a relatively large current, or where the working current provided by the input end LINE cannot meet the requirement of the relay, so that a full-wave rectifier is required to enable the relay to function properly. This device prevents the hidden safety threat during operation, thereby improving the safety of the leakage current protection device and the connected electrical appliances.

Third Embodiment

Figure 3:
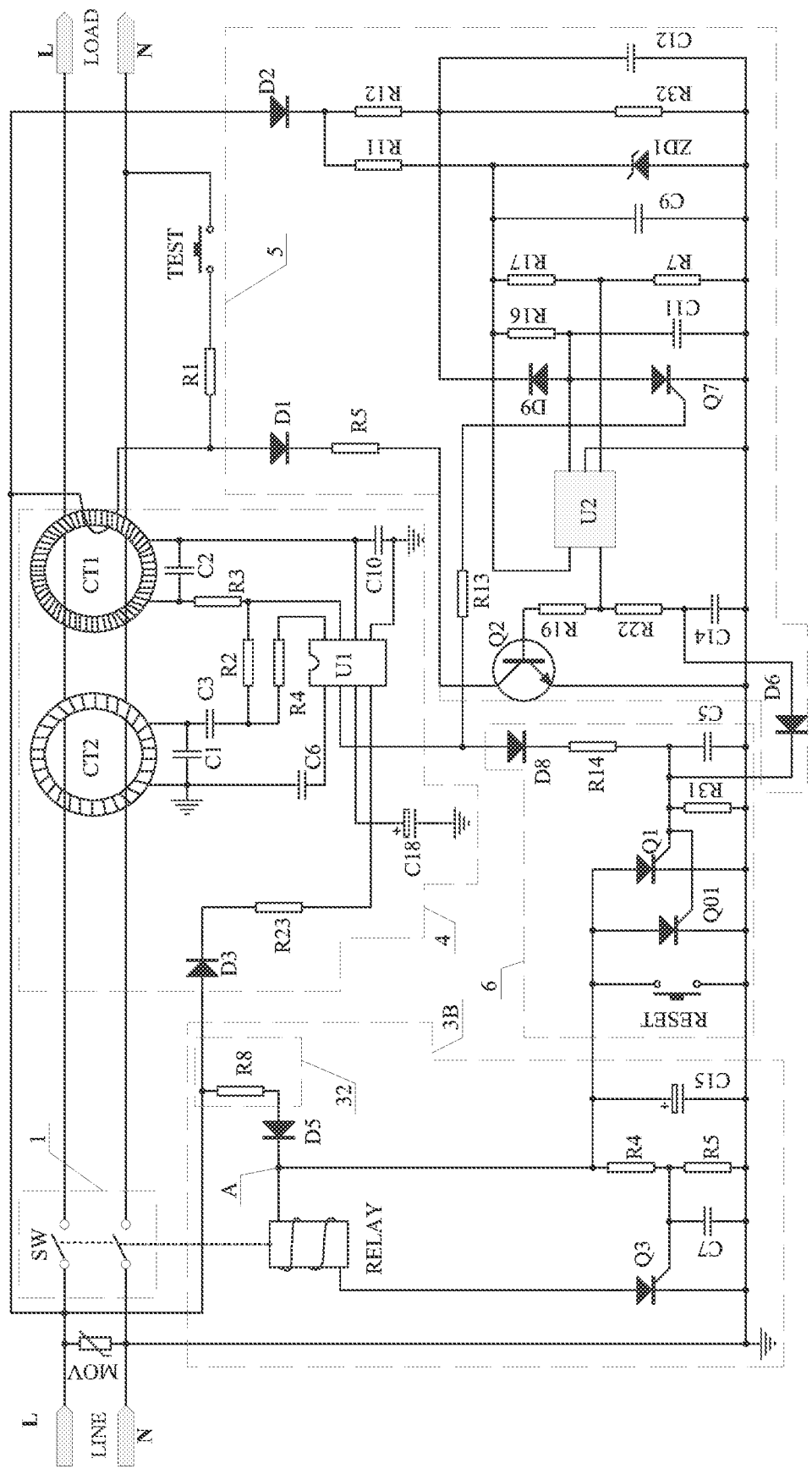
FIG. 3 is a circuit diagram of a relay-type leakage current protection device according to a third embodiment of the present invention.

FIG. 3 illustrates a relay-type leakage current protection device according to the third embodiment. In this embodiment, the leakage current protection device includes: a switch circuit 1, a relay circuit 3B, a leakage current detection circuit 4, a self-test circuit 5, and a drive circuit 6. The structure and function of the switch circuit 1, the leakage current detection circuit 4, the self-test circuit 5, and the drive circuit 6 are the same as or similar to those of the corresponding circuits of the first embodiment, and their descriptions will not be repeated here.

As shown in FIG. 3, the current limiting circuit of the relay circuit 3B includes a voltage step-down circuit 32 and a rectifier. The voltage step-down circuit 32 is a resistor R8, with its one end coupled to the input side, operable to limit the maximum working current flowing through the relay RELAY. The rectifier includes a diode D5, i.e., it is a half-wave rectifier. One end of diode D5 of the rectifier is coupled to the voltage step-down circuit 32, and the other end of diode D5 is coupled to the relay RELAY, so that the rectifier supplies a rectified working current to the relay RELAY.

In this embodiment, the current limiting circuit may be provided at any location of the circuit of the relay circuit 3B so long as it achieves the function of supplying the working current to the relay circuit 3B.

The operating principle of the leakage current protection device of the third embodiment is similar to that of the first embodiment and the description is not repeated here.

In this embodiment, the voltage step-down circuit 32 replaces the resistor-capacitor voltage circuit 31 of the first and second embodiments. Compared to the first and second embodiments, the voltage step-down circuit 32 of the third embodiment is suitable for situations where the working current of the relay RELAY is relatively small, where the installation space of the relay-type leakage current protection device is relatively large, and where the device needs to be relatively low cost.

Fourth Embodiment

Figure 4:
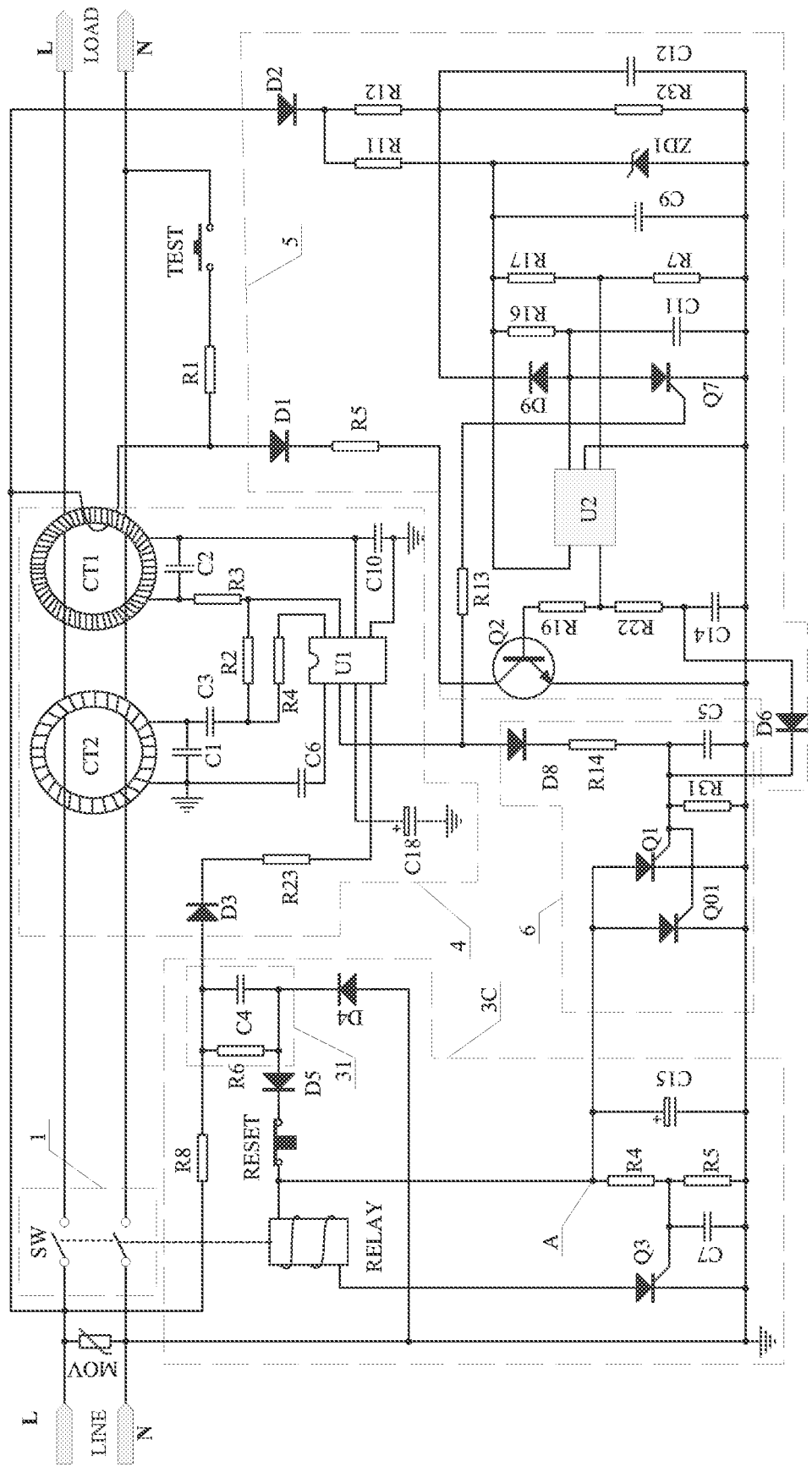
FIG. 4 is a circuit diagram of a relay-type leakage current protection device according to a fourth embodiment of the present invention.

FIG. 4 illustrates a relay-type leakage current protection device according to the fourth embodiment. In this embodiment, the leakage current protection device includes: a switch circuit 1, a relay circuit 3C, a leakage current detection circuit 4, a self-test circuit 5, and a drive circuit 6. The structure and function of the switch circuit 1, the leakage current detection circuit 4, the self-test circuit 5, and the drive circuit 6 are the same as or similar to those of the corresponding circuits of the first embodiment, and their descriptions will not be repeated here.

In this embodiment, the relay circuit 3C includes a resistor-capacitor voltage step-down circuit 31, a rectifier, a reset switch RESET1 that is normally closed, a relay RELAY, and an auxiliary reset element Q3. In this embodiment, the normally closed reset switch RESET1 is coupled between the rectifier and the relay RELAY. Alternatively, the normally closed reset switch RESET1 may be coupled between the input end and the resistor-capacitor voltage circuit 31. The normally closed reset switch RESET1 controls the switching state of the relay circuit 3C. In this embodiment, the current limiting circuit (the voltage step-down circuit and the rectifier) may be provided at any location of the circuit of the relay circuit 3C so long as it achieves the function of supplying the working current to the relay circuit 3C.

The operating principle of the relay-type leakage current protection device of the fourth embodiment is similar to that of the first embodiment, one difference being: When the normally closed reset switch RESET1 is in the closed state and the relay circuit 3C is connected to the power line, a current flows through resistor R8, capacitor C4, diode D5, capacitor C15, resistor R4, and resistor R5 of the relay circuit 3C to trigger the auxiliary reset element Q3 to become and remain conductive. Therefore, a current loop is formed from the input end LINE, through resistor R8, capacitor C4, diode D5, relay RELAY, and auxiliary reset element Q3 to ground. Thus, the relay RELAY generates a magnetic field to cause the switch circuit 1 to be closed, thereby accomplishing the electrical connection between the input end LINE and the output end LOAD.

When a fault is detected, the leakage current detection circuit 4 and/or self-test circuit 5 causes the drive circuit 6 to drive the relay circuit 3C to open the switch circuit 1, cutting off the power at the output end LOAD. Then, briefly opening the normally closed reset switch RESET1 (e.g., pressed by the user) cuts off current to the relay RELAY, and also disconnects the holding current of transistors Q01 and Q1; this resets the device.

The normally closed reset switch RESET1 shown in the fourth embodiment may also be optionally provided in the first to third embodiment to provide another reset mechanism.

Fifth Embodiment

Figure 5:
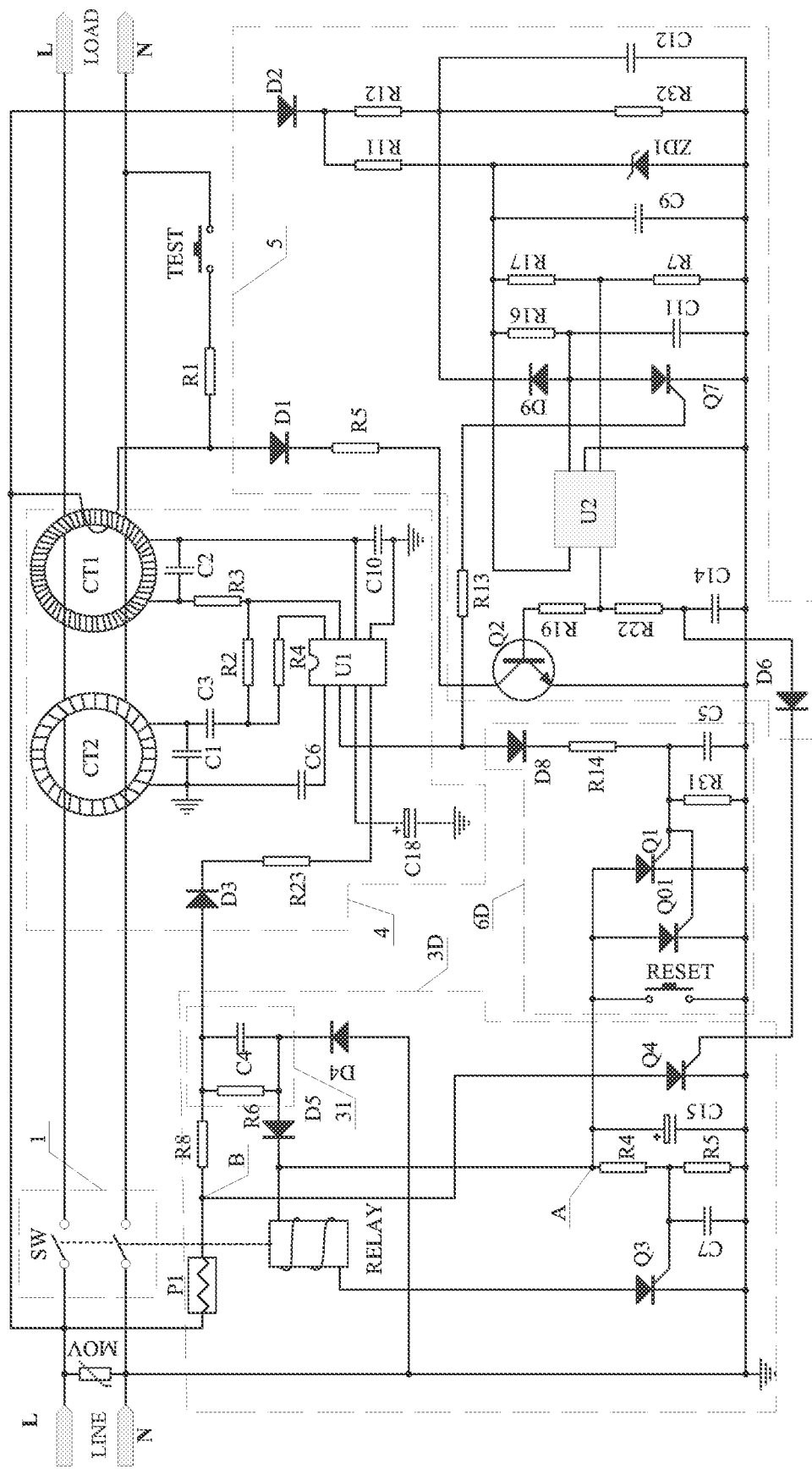
FIG. 5 is a circuit diagram of a relay-type leakage current protection device according to a fifth embodiment of the present invention.

FIG. 5 illustrates a relay-type leakage current protection device according to the fifth embodiment. In this embodiment, the leakage current protection device includes: a switch circuit 1, a relay circuit 3D, a leakage current detection circuit 4, a self-test circuit 5, and a drive circuit 6D. The structure and function of the switch circuit 1, the leakage current detection circuit 4, and the self-test circuit 5 are the same as or similar to those of the corresponding circuits of the first embodiment, and their descriptions will not be repeated here.

As shown in FIG. 5, the relay circuit 3D includes: a fuse P1, a current limiting circuit, a relay RELAY, an auxiliary reset element Q3, and a first drive control element Q4. The structures and functions of the current limiting circuit, relay RELAY, and auxiliary reset element Q3 are the same as or similar to those of the corresponding components of the first embodiment, and their descriptions will not be repeated here. In the fifth embodiment, the fuse P1 is coupled between the input end and the current limiting circuit. The first drive control element Q4 is coupled at its first end to the fuse P1, at its second end of the self-test circuit 5, and at its third end to the ground. The first drive control element Q4 operates to increase the current flowing through the fuse P1 in response to a fault signal from the self-test circuit 5. By melting the fuse P1, the current through the relay RELAY is interrupted, so the relay RELAY controls the switch circuit 1 to disconnect the power connection.

In this embodiment, the current limiting circuit may be provided at any location of the circuit of the relay circuit 3D so long as it achieves the function of supplying the working current to the relay circuit 3D.

In this embodiment, the drive circuit 6D includes at least a second drive control circuit (which includes at least transistors Q11 and Q1 coupled in parallel), and a normally open reset switch RESET. The second drive control circuit is coupled at one end to the relay circuit 3D, and at another end to the leakage current detection circuit 4. In response to the leakage current signal from the leakage current detection circuit 4, the second drive control circuit controls the auxiliary reset element Q3 to become open (non-conductive), so as to open the switch circuit 1. The normally open reset switch RESET is coupled in parallel to the second drive control circuit. After the switch circuit 1 is opened by the second drive control circuit, the normally open reset switch RESET may be closed briefly (e.g. pressed by the user), which causes the auxiliary reset element Q3 to become conductive, so as to close the switch circuit 1.

The operating principle of the relay-type leakage current protection device of the fifth embodiment is similar to that of the first embodiment, with the following difference.

When the detection function of the leakage current detection circuit 4 is lost (for example, when capacitor C2 is shorted or the leakage current detection chip U1 is faulty), the periodic self-test signals generated by transistor Q2 of the self-test circuit 5 cannot be coupled back to the self-test circuit 5. As a result, resistor R22 charges capacitor C14, causing a current to flow through diode D6, which in turn triggers transistor Q4 to become and remain conductive. As a result, the current at point B in FIG. 5 increases, melting the fuse P1. Consequently, no current flows through the relay RELAY, causing the switch circuit 1 to become open, cutting off the power at the output end LOAD.

In this embodiment, the half-waver rectifier may be replaced by the full-wave rectifier BD of FIG. 2, and/or, the resistor-capacitor voltage circuit 31 may be replaced by the voltage step-down circuit 32 of FIG. 3.

In the first to fifth embodiments, each of the various transistors (e.g., Q3, Q11, Q1, Q2, Q4) may be a MOS transistor, a silicon-controlled rectifier, a transistor, etc.

The relay-type leakage current protection device according to embodiments of the present invention can detect leakage current fault between the input end and output end as well as faults of internal components of the leakage current protection device. When either kind of fault is detected, the device can control the relay to cut off the power connection between the input end and the output end, thereby ensuring safety of the appliance.

It will be apparent to those skilled in the art that various modification and variations can be made in the relay-type leakage current protection devices of the present invention without departing from the spirit or scope of the invention. Thus, it is intended that the present invention cover modifications and variations that come within the scope of the appended claims and their equivalents.

What is claimed is:

1. A relay-type leakage current protection device, coupled to a power supply line having an input end and an output end, the device comprising:
   a switch circuit, coupled on the power supply line between the input end and an output end, configured to control electrical connection between the input end and the output end;
   a relay circuit, coupled to the input end and the switch circuit, configured to control an open/close state of the switch circuit, the relay circuit including:
      a current limiting circuit, configured to supply a working current to the relay circuit;
      a relay, coupled to the current limiting circuit, configured to control the open/close state of the switch circuit; and
      an auxiliary reset element, coupled to the relay, configured to control operation of the relay,
      wherein the current limiting circuit is further coupled to the auxiliary reset element and configured to trigger the auxiliary reset element to become and remain conductive whereby the switch circuit becomes closed;
   a leakage current detection circuit, coupled to the power supply line, configured to output a leakage current signal in response to detecting a leakage current at the output end of the power supply lines;
   a self-test circuit, coupled to the power supply lines and the leakage current detection circuit, configured to periodically generate a self-test pulse signal which simulates the leakage current and to output a fault signal in response to detecting a fault condition in the leakage current detection circuit; and a drive circuit, coupled to the leakage current detection circuit, the self-test circuit and the relay circuit, and configured to drive the relay circuit in response to receiving the leakage current signal from the leakage current detection circuit or the fault signal from the self-test circuit.

2. The relay-type leakage current protection device of claim 1, wherein the drive circuit includes a drive control circuit, coupled at one end to the auxiliary reset element and at another end to the leakage current detection circuit and the self-test circuit, and configured to, in response to receiving the leakage current signal or the fault signal, control the auxiliary reset element to be in a non-conducting state, whereby the switch circuit becomes open.

3. The relay-type leakage current protection device of claim 2, wherein the drive circuit further includes a normally open reset switch, coupled in parallel to the drive control circuit, wherein the normally open reset switch is configured to, when the switch circuit is in an open state and the normally open reset switch is closed briefly, control the auxiliary reset element to be in a conductive state, whereby the switch circuit becomes closed.

4. The relay-type leakage current protection device of claim 1, wherein the current limiting circuit includes:
  a resistor-capacitor voltage step-down circuit, configured to limit a maximum current flowing through the relay; and
  a rectifier, coupled at one end to the resistor-capacitor voltage step-down circuit and at another rend to an end of the relay, configured to supply a rectified working current to the relay.

5. The relay-type leakage current protection device of claim 4, wherein the rectifier is a half-wave rectifier or a full-wave rectifier.

6. The relay-type leakage current protection device of claim 1, wherein the current limiting circuit includes:
  a voltage step-down circuit, configured to limit a maximum current flowing through the relay; and
  a rectifier, coupled at one end to the voltage step-down circuit and at another rend to an end of the relay, configured to supply a rectified working current to the relay.

7. The relay-type leakage current protection device of claim 6, wherein the rectifier is a half-wave rectifier or a full-wave rectifier.

8. The relay-type leakage current protection device of claim 1, wherein the relay circuit further includes a normally closed reset switch, coupled between the current limiting circuit and the relay, or coupled between the input end and the current limiting circuit, configured to control the operation of the relay and control a state of the drive circuit to reset the relay-type leakage current protection device.

9. A relay-type leakage current protection device, coupled to a power supply line having an input end and an output end, the device comprising:
  a switch circuit, coupled on the power supply line between the input end and an output end, configured to control electrical connection between the input end and the output end;
  a relay circuit, coupled to the input end and the switch circuit, configured to control an open/close state of the switch circuit;
  a leakage current detection circuit, coupled to the power supply line, configured to output a leakage current signal in response to detecting a leakage current present at the output end of the power supply lines;
  a self-test circuit, coupled to the power supply lines and the leakage current detection circuit, configured to periodically generate a self-test pulse signal which simulates the leakage current and to output a fault signal in response to detecting a fault present in the leakage current detection circuit; and
  a drive circuit, coupled to the leakage current detection circuit, the self-test circuit and the relay circuit, and configured to drive the relay circuit in response to receiving the leakage current signal from the leakage current detection circuit or the fault signal from the self-test circuit;
  wherein the relay circuit includes:
    a current limiting circuit, configured to supply a working current to the relay circuit;
    a relay, coupled to the current limiting circuit, configured to control the open/close state of the switch circuit;
    an auxiliary reset element, coupled to the relay, configured to control operation of the relay,
    wherein the current limiting circuit is further coupled to the auxiliary reset element and configured to trigger the auxiliary reset element to become and remain conductive whereby the switch circuit becomes closed;
    a fuse, coupled between the input end and the current limiting circuit; and
    a first drive control element, coupled at its first end to the fuse, at its second to the self-test circuit, and at its third end to ground, configured to increase a current flowing through the fuse in response to receiving the fault signal from the self-test circuit, wherein melting of the fuse interrupts the working current flowing through the relay, whereby the switch circuit becomes open.

10. The relay-type leakage current protection device of claim 9, wherein the drive circuit includes a second drive control element, coupled at its first end to the relay circuit, at its second end to the leakage current detection circuit, and at its third end to the ground, and configured to, in response to receiving the leakage current signal from the leakage current detection circuit, control the auxiliary reset element to be in an non-conducting state, whereby the switch circuit becomes open.

11. The relay-type leakage current protection device of claim 10, wherein the drive circuit further includes a normally open reset switch, coupled in parallel to the second drive control circuit, wherein the normally open reset switch is configured to, when the switch circuit is in an open state and the normally open reset switch is closed briefly, control the auxiliary reset element to be in a conductive state, whereby the switch circuit becomes closed.

12. The relay-type leakage current protection device of claim 9, wherein the current limiting circuit includes:
  a resistor-capacitor voltage step-down circuit, configured to limit a maximum current flowing through the relay; and
  a rectifier, coupled at one end to the resistor-capacitor voltage step-down circuit and at another rend to an end of the relay, configured to supply a rectified working current to the relay.

13. The relay-type leakage current protection device of claim 12, wherein the rectifier is a half-wave rectifier or a full-wave rectifier.

14. The relay-type leakage current protection device of claim 9, wherein the current limiting circuit includes:
- a voltage step-down circuit, configured to limit a maximum current flowing through the relay; and
- a rectifier, coupled at one end to the voltage step-down circuit and at another rend to an end of the relay, configured to supply a rectified working current to the relay.

15. The relay-type leakage current protection device of claim 14, wherein the rectifier is a half-wave rectifier or a full-wave rectifier.

16. The relay-type leakage current protection device of claim 9, wherein the relay circuit further includes a normally closed reset switch, coupled between the current limiting circuit and the relay, or coupled between the input end and the current limiting circuit, configured to control the operation of the relay and control a state of the drive circuit to reset the relay-type leakage current protection device.

* * * * *